United States Patent [19]

Baaso

[11] 3,811,708
[45] May 21, 1974

[54] TRAILER HITCH
[75] Inventor: George L. Baaso, Royal Oak, Mich.
[73] Assignee: The United States of America as represented by the Secretary of the Army, Washington, D.C.
[22] Filed: Feb. 13, 1973
[21] Appl. No.: 331,752

[52] U.S. Cl. ............................................. 280/433
[51] Int. Cl. .......................................... B62d 53/08
[58] Field of Search ..................... 280/433, 407, 438

[56] References Cited
UNITED STATES PATENTS
3,600,005   8/1971   Glaza .................................. 280/433
2,838,324   6/1958   Dalton ............................... 280/433
1,986,149   1/1935   Harris ................................ 280/433

FOREIGN PATENTS OR APPLICATIONS
1,040,382   10/1958   Germany .......................... 280/433

Primary Examiner—Leo Friaglia
Assistant Examiner—Randall A. Schrecengost
Attorney, Agent, or Firm—Edward J. Kelly; Herbert Berl; John F. Schmidt

[57] ABSTRACT

A kingpin socket has a vertical opening which is frusto-conical at the bottom, converging upward, and horizontally slotted at the top. A kingpin has a T-head that passes through the socket slot and is then turned to place the T across the slot against a stop. A radially split nut having an external conical surface engages a thread on the kingpin and tightly frictionally grips the socket cone. Cooperating cylindrical surfaces on the kingpin and in the socket give the assembly lateral stability, and a sleeve welded to an upper surface of the socket and to the trailer floor gives the socket added stiffness and strength.

12 Claims, 6 Drawing Figures 3,811,708

TRAILER HITCH

The invention described herein may be manufactured, used, and licensed by or for the Government for governmental purposes without payment to me of any royalty thereon.

BACKGROUND OF THE INVENTION

1. Field of the Invention

The invention relates to trailer hitches, specifically to semi-trailers and the means to couple them with tractors by way of a fifth wheel mounted on the tractor and a kingpin on the semi-trailer engageable with the fifth wheel. In particular, the invention concerns military off-highway haulers and the desirability of a readily removable kingpin, i.e., a kingpin which is easily replaced in the field without torch-cutting out the worn or damaged kingpin and welding in a new one.

2. Description of the Prior Art

The known prior art in use consists of kingpins welded in place, and removed by torch-cutting. Easily replaceable kingpins are not available, probably because it is difficult to produce commercially a replaceable kingpin which is "solid" enough to withstand the severe accelerations to which such hitches are subjected in use. A hitch that has the required rigidity and strength is usually one that does not come apart easily; and conversely, a hitch with a readily replaceable kingpin is likely to have too much "play" in the assembled parts and thus, because of the replaceability, have inherent weaknesses which contribute to short life of the hitch.

SUMMARY OF THE INVENTION

The invention comprises an open-ended socket adapted to be permanently secured (as by welding) in the basic structural steel frame of the semi-trailer with the opening axis in the vertical position. At its lower end, the opening is frusto-conical and at its upper end it is asymmetric, in a horizontal plane, about said vertical axis. Between its ends, the opening is provided with a cylindrical surface. A kingpin is held in the opening with its axis of rotation coincident with the opening axis. The upper end of the kingpin is T-shaped and can pass through the asymmetric upper end of the socket opening in one angular position but cannot pass through in another angular position wherein the T rests on an upper surface of the socket against the top on that upper surface. A threaded surface on the kingpin lies in, and spaced from, the frusto-conical surface. Between the threaded surface and the T-shaped end, the kingpin has a cylindrical surface that fits the corresponding portion of the socket opening. A nut has an external frusto-conical surface to fit the similar surface in the socket and an internal thread that engages the kingpin thread. The nut is split to allow it to be wedged tightly between the kingpin and the internal frusto-conical surface, forcing the two conical surfaces into tight frictional engagement.

A steel sleeve is welded to the upper side of the socket and to the trailer floor to provide a rigid hitch structure of great strength.

DESCRIPTION OF A PREFERRED EMBODIMENT

Figure 1:
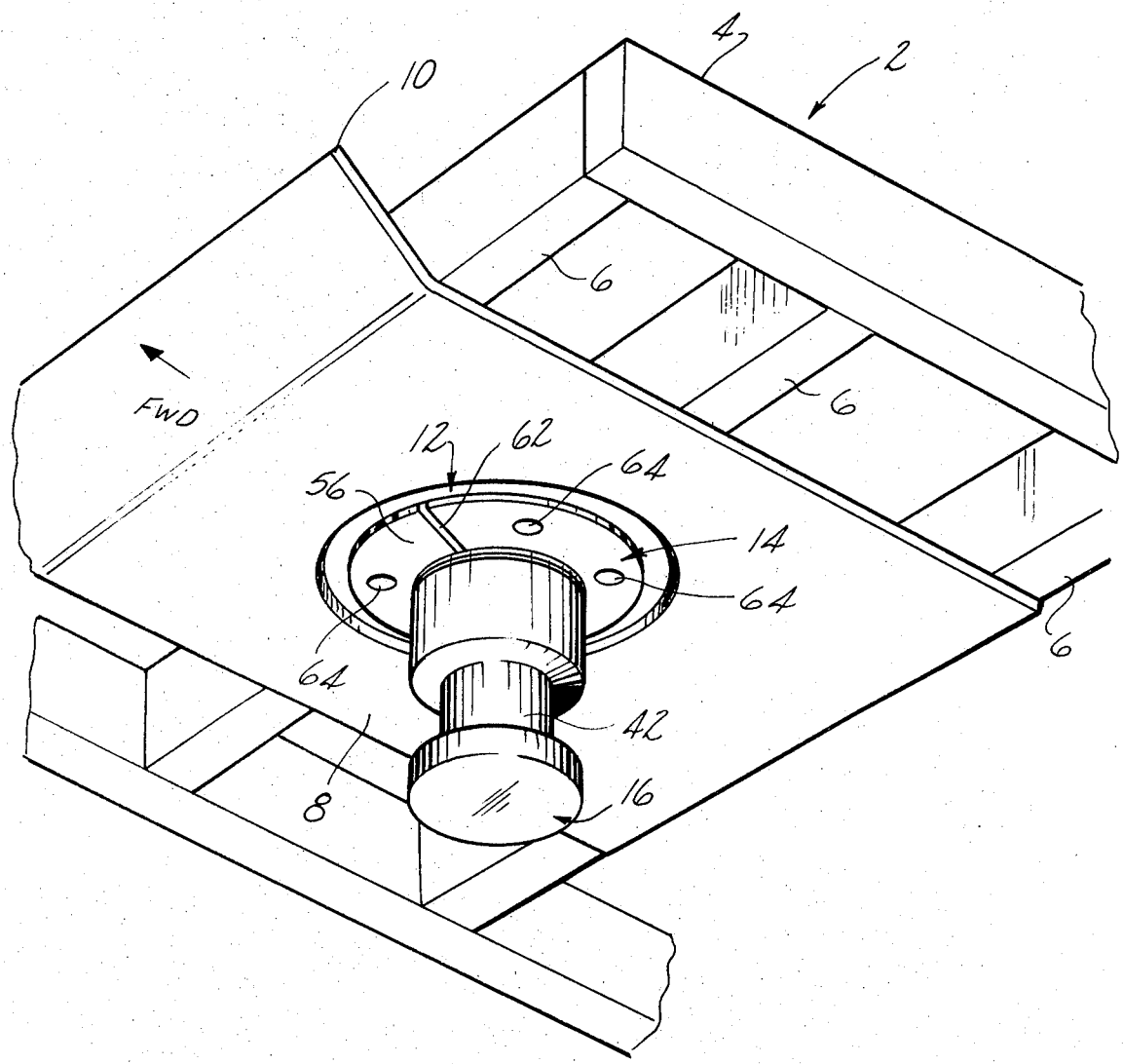
FIG. 1 is a perspective view from the underside of a semi-trailer front end showing the external appearance of the trailer portion of a hitch embodying this invention.

A semi-trailer is shown generally at 2, having a rectangular frame 4 with cross members 6 and a fifth wheel plate 8 curved upward at its forward end as at 10. A socket 12 shows in FIG. 1 as a ring, closely engaged by a nut 14, with a kingpin 16 at the center.

Figure 2:
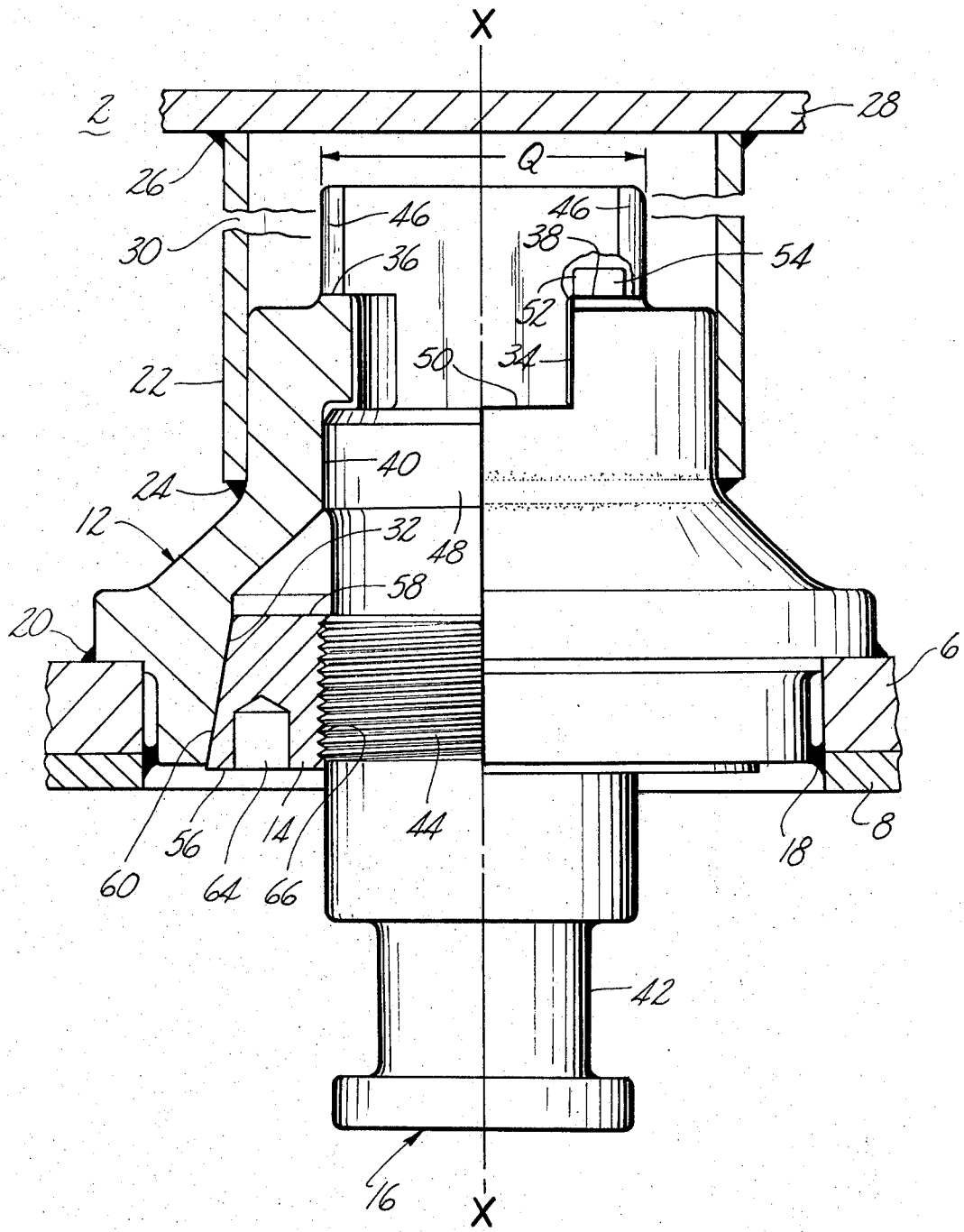
FIG. 2 is a partial section through the kingpin axis.

The invention is shown in more detail in FIG. 2. Socket 12 is secured to the structural steel members 6 of the trailer by means of welds 18 and 20. A steel sleeve 22 is welded at 24 to socket 12 and at 26 to the floor 28 of the trailer structure. Note the break in the sleeve shown at 30 to indicate greater length of sleeve 22 than appears in FIG. 2; the length of sleeve 22 depends upon the depth of the trailer steel structure. It will appear to those skilled in the art that a depth of 12 inches, top to bottom, of the trailer structure will produce a more rigid hitch than a depth of six inches, for example; and that the addition of sleeve 22 adds greatly to the overall strength and rigidity of the total hitch structure, making it possible to take advantage of a substantial top-to-bottom depth of the trailer structure.

As is apparent in FIG. 2, socket 12 has a central opening; the axis X — X of the opening is vertical and coincides with the rotational axis of kingpin 16. At its lower end, the opening has an upwardly convergent frusto-conical internal surface 32. At its upper end, the socket opening is made asymmetric by the provision of a diametral slot 34. The upper external end of socket 12 is provided with opposed arcuate surfaces 36 and 38. It will further be apparent from FIG. 2 that the opening in socket 12 is smaller at its upper end than at its lower end.

The asymmetric upper end of the opening in socket 12 indicates (FIG. 5) a diameter d, a slot width w, and a slot length L. Thus, the upper end of the opening is asymmetric, in the plane of FIG. 5, about the aforesaid axis X — X, which shows as a point in FIG. 5.

Between the frusto-conical lower end and the asymmetric upper end, the socket opening is provided with an internal cylindrical surface 40 having a diameter δ which is larger than the asymmetric opening dimensions w and d, and is smaller than the asymmetric opening dimension L.

Figure 4:
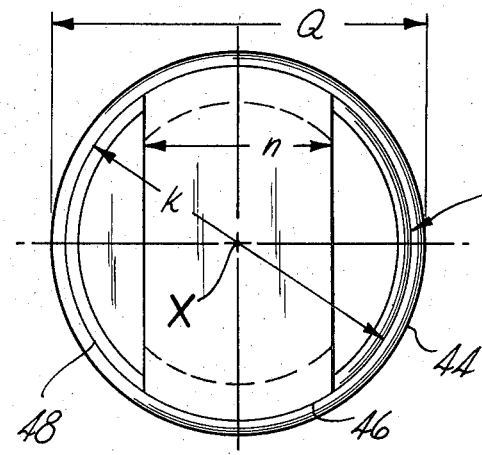
FIG. 4 is a top plan view of the kingpin.
Figure 3:
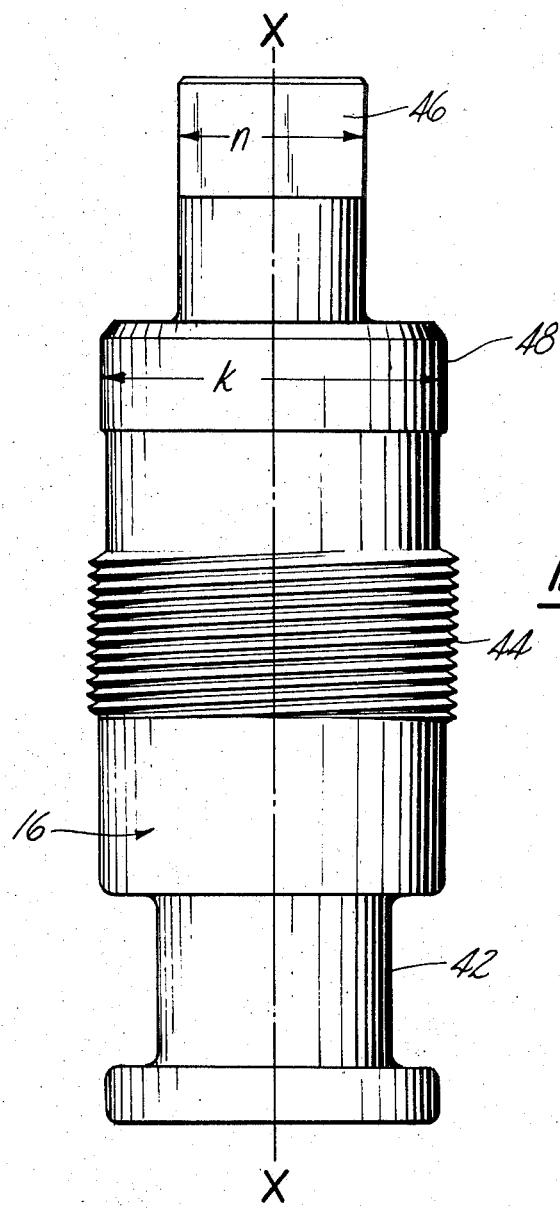
FIG. 3 is an elevation view of the kingpin from a position 90° from the position the kingpin occupies in FIG. 2.

Turning now to FIGS. 2, 3, and 4 for a detailed description of kingpin 16, it is apparent that the kingpin is provided with a conventional groove 42 for engagement with a conventional tractor fifth wheel. Kingpin 16 is provided with an externally threaded surface 44 which is within, and smaller than, frusto-conical surface 32 in the hitch assembly. Threaded surface 44 and frusto-conical surface 32 partially define a toroidal space which is occupied by nut 14.

Figure 5:
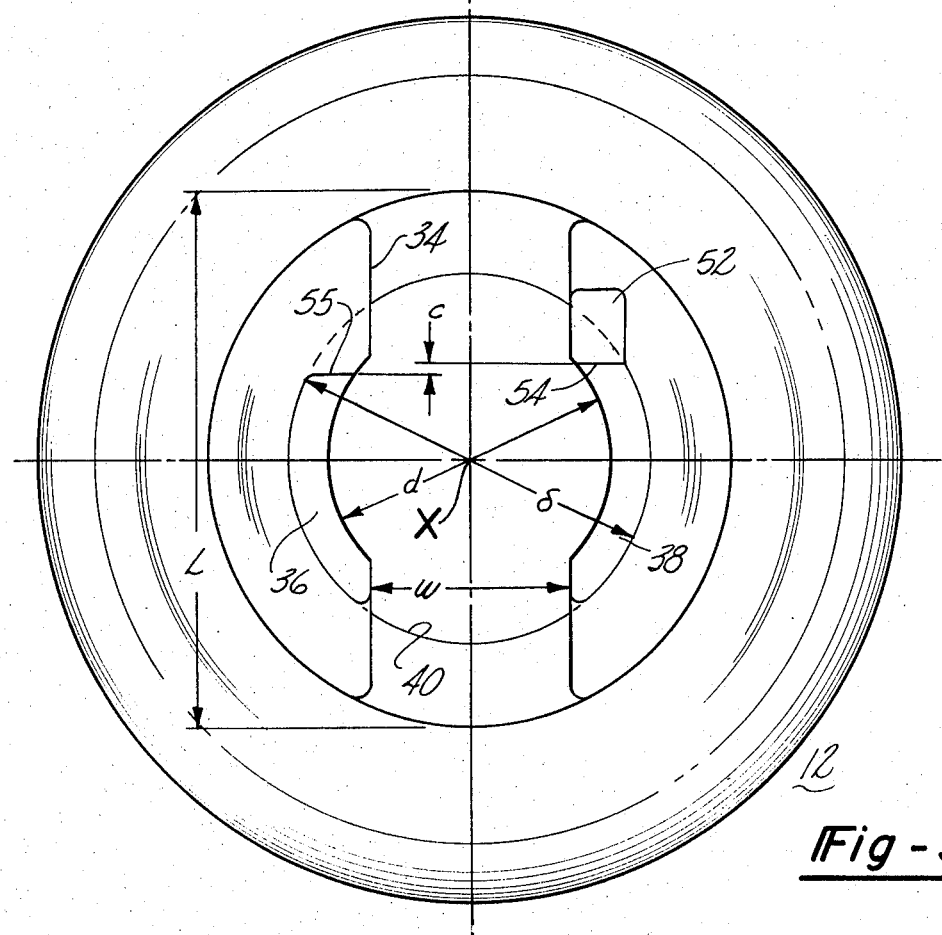
FIG. 5 is a top plan view of the empty socket, on about half of the scale of FIG. 2.

The upper end of the kingpin is T-shaped, which shape appears in FIG. 2 but is not apparent in the side view provided in FIG. 3. It will thus be apparent, especially in FIG. 4, that the upper end of kingpin 16 is asymmetric about axis X — X in the plane of FIG. 4, corresponding to the asymmetric configuration of the upper end of the opening in socket 12 (FIG. 5). The maximum dimension Q of the T-head is actually the diameter of an interrupted arcuate (cylindrical) surface 46. The width of the T-head has a dimension n.

Intermediate the surfaces 44 and 46, kingpin 16 is provided with a cylindrical external surface 48 having a diameter $k$. In the assembled hitch, surface 48 lies within surface 40 of the socket. For a combination of maximum rigidity and ease of assembly, surfaces 40 and 48 would desirably be in contact with a friction fit, turnable manually. However, it is unlikely that such precision will be feasible in actual mass production.

Because the upper end of kingpin 16 is covered by floor 28 and, quite often, by a load on that floor, the upper surface is inaccessible, as for example to a hammering force. Moreover, so tight a fit as to require hammering to drive the kingpin out of the socket would make manual turning the kingpin in the socket virtually impossible. A minimum clearance of 0.002 inch is deemed desirable for a maintenance capability with a minimum of tools. As an example of the problem, removal of a kingpin should not require a pipe wrench with a handle ten feet long to turn the kingpin in the socket, plus a specially designed pulling tool to extract the kingpin from the socket. These things must often be done by one man, in the field, and must be done quickly, especially when the equipment is in an area readily accessible to enemy action or even just surveillance. Success in modern warfare requires mobility.

Because the T-head of kingpin 16 must pass through cylindrical surface 40, it will be evident that dimension Q must be less than diameter $\delta$. The bottom 50 of slot 34 is below the upper end of cylindrical surface 40, so that the T-head of kingpin 16 will pass all the way through the socket opening so long as diameter Q is small enough to allow free passage through the surface 40 portion of the socket opening, when kingpin 16 is oriented angularly with the long dimension Q of the T-head aligned with slot 34. It will be apparent to those skilled in the art that such free passage also requires that dimension n (the width of the T-head, shown in FIGS. 3 and 4) is less than dimension $w$ (the width of slot 34).

A stop 52 on arcuate surface 38 is provided with a face 54 to engage one side of the T-head of kingpin 16 to hold the T-head in its assembled position as seen in FIG. 2, in which the long axis of the T is perpendicular to slot 34.

It will be noted in FIG. 5 that the upper limit 55 of surface 36 is slightly below face 54 of stop 52, by an amount $c$ as shown. Socket 12 is conveniently a steel casting, and surfaces 36 and 38 are machined by a tool moving horizontally across the surfaces. The tool must clear face 54 but must not leave even a small ridge rising above surface 36, and the gap $c$ assures that the upper limit of surface 36 will be engaged by the tool.

Figure 6:
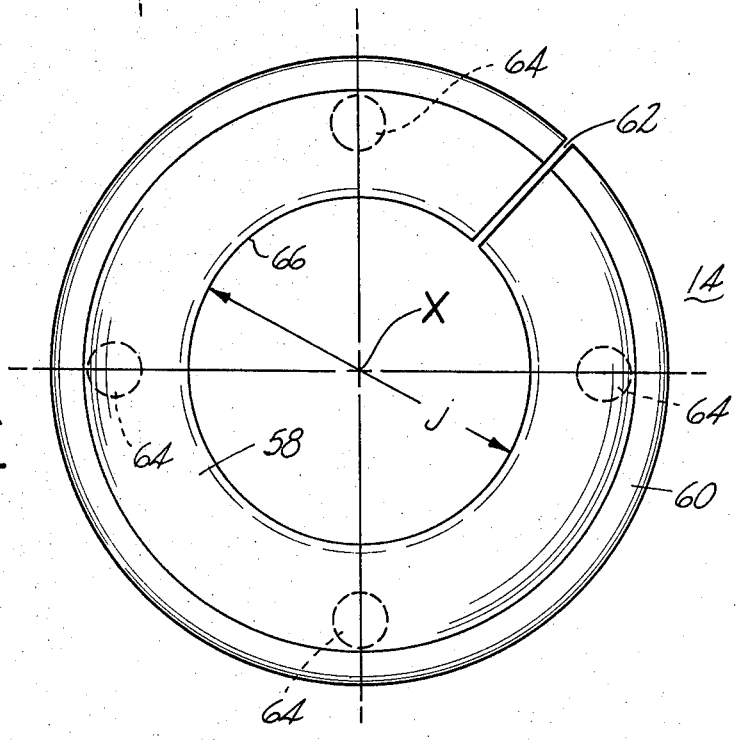
FIG. 6 is a top plan view of the nut, to the same scale as FIG. 5.

Attention is now directed to FIGS. 1, 2, and 6 for a more detailed discussion of nut 14. Nut 14 is a torus, bounded below by a plane surface 56 and above by a plane surface 58; the external periphery of nut 14 is frusto-conical, shown as surface 60. Nut 14 is made circumferentially discontinuous by the provision of a slot 62, shown in this embodiment as being radial. Holes 64 are provided in surface 56 to accommodate a spanner wrench, not shown.

Nut 14 is internally threaded as shown at 66 to engage the externally threaded surface 44 of kingpin 16. It will be apparent to those skilled in the art that the minimum diameter j of the threaded opening 66 of nut 14 should be greater than the diameters Q and $k$ if it be desired to assemble nut 14 and kingpin 16 by passing the T-head through the nut. Such a relationship of the diameters is desirable because it may become necessary to use kingpins having larger coupling ends (lower end of the kingpin which includes groove 42) than shown in this embodiment. Such a feature might be a necessity to provide for interchangeability of kingpins so that the trailer can be coupled with a tractor having a different size fifth wheel.

OPERATION

When the operator or a maintenance mechanic wishes for some reason to remove the kingpin 16 shown in FIG. 2, he uses a spanner wrench to loosen nut 14. A fraction of a turn will usually suffice to loosen the kingpin in the socket, after which the kingpin is turned counterclockwise (as seen from below) through 90°, which rotates the T-head away from stop 52. When the long axis of the T-head is aligned with slot 34, the kingpin can be withdrawn from the socket. If the old nut 14 is still serviceable, it can be unscrewed from the old kingpin and turned onto a new kingpin; otherwise a new nut and kingpin assembly is inserted into socket 12 with the T-head aligned with slot 14 so as to pass through it.

Nut 14 must not be so high up on surface 44 as to prevent the clockwise turning of kingpin 16 to put the T-head across the slot 34 and in contact with face 54 of stop 52. With kingpin 16 in the angular position shown in FIG. 2, nut 14 is tightened by a spanner wrench, partially closing slot 62 and wedging nut 14 into tight frictional engagement with frusto-conical surface 32. This action tightly clamps kingpin 16 between the surfaces 36 and 38 at the upper end of socket 12 and the internal frusto-conical surface 32 at the lower end of the socket.

I wish it to be understood that I do not desire to be limited to the exact details of construction shown and described, for obvious modifications will occur to a person skilled in the art.

What is claimed is:

1. A trailer hitch comprising:
   a. an open-ended socket adapted to be secured in a trailer floor,
      i. the socket opening having an axis which coincides with the rotational axis of a kingpin to be held in the socket,
      ii. said opening axis being vertical in the secured position of the socket,
      iii. the lower end of the opening being frusto-conical and converging upward,
      iv. the upper end of the opening being asymmetric in a horizontal plane about the opening axis, and smaller than the lower end of the opening, and
      v. the opening having an intermediate portion which is cylindrical, having a diameter larger than the asymmetric opening in one horizontal direction and smaller than the asymmetric opening in another direction;

b. a kingpin removably secured in the opening in said socket and having
  i. a threaded diameter disposed in and smaller than said frusto-conical portion of the socket opening and forming a toroidal space with the frusto-conical surface,
  ii. an upper end which is asymmetric in a horizontal plane and adapted in one angular position to pass through said asymmetric opening and in another angular position to be incapable of passing through said asymmetric opening, and
  iii. an intermediate diameter corresponding to and adapted to lie in the intermediate portion of said socket opening; and
c. a nut adapted to be disposed in the toroidal space and having
  i. a frusto-conical surface corresponding and adapted to frictionally engage the frusto-conical portion of the socket opening, and
  ii. an internally threaded surface corresponding and adapted to engage the threaded diameter of the kingpin.

2. A hitch as in claim 1, and a stop on the upper surface of the socket to limit the angular movement of the kingpin in the socket opening.

3. A hitch as in claim 2, wherein the nut is circumferentially discontinuous.

4. A hitch as in claim 1 wherein the nut is circumferentially discontinuous.

5. A hitch as in claim 1, and a sleeve secured to the upper end of the socket.

6. A hitch as in claim 1, in which the upper end of the kingpin is T-shaped and engageable in said another angular orientation with an upper surface of the socket whereby the nut tightly clamps the kingpin between said upper surface and the internal frusto-conical surface.

7. A trailer hitch cooperable with a tractor fifth wheel and comprising:
a. an open-ended socket comprising a housing with an opening adapted to receive a non-circular element of the king pin, the socket opening having a substantially vertical axis and a frusto-conical internal surface at its lower end;
b. a kingpin having an axis of rotation coincident with said vertical axis, an externally threaded portion, and a non-circular upper end corresponding to the opening in the socket and adapted to pass through said opening in one angular orientation about its axis and incapable of withdrawing from said opening in another angular orientation; and
c. a nut having an external frusto-conical surface and an internally threaded portion and adapted to lie in said socket opening with its external frusto-conical surface in tight frictional engagement with said internal frusto-conical surface and with its internally threaded portion in engagement with the externally threaded portion of the kingpin.

8. A hitch as in claim 7, in which the upper end of the kingpin is T-shaped and engageable in said another angular orientation with an upper surface of the socket whereby the nut tightly clamps the kingpin between said upper surface and the internal frusto-conical surface.

9. A hitch as in claim 8, and a stop on said upper surface and engageable with said T-shaped upper end in said another angular orientation of the kingpin.

10. A hitch as in claim 9, wherein the socket is provided with an internal cylindrical surface, and an external cylindrical surface on the kingpin adapted to be disposed in said internal cylindrical surface.

11. A hitch as in claim 8, wherein the socket is provided with an internal cylindrical surface, and an external cylindrical surface on the kingpin adapted to be disposed in said internal cylindrical surface.

12. A hitch as in claim 7, wherein the socket is provided with an internal cylindrical surface, and an external cylindrical surface on the kingpin adapted to be disposed in said internal cylindrical surface.

* * * * *